US007983821B2

(12) United States Patent
Reeves

(10) Patent No.: US 7,983,821 B2
(45) Date of Patent: Jul. 19, 2011

(54) SYSTEM AND METHOD FOR INDICATING TO A REMOTE LOCATION OPERATION OF AN AUGER OR THE LIKE

(76) Inventor: Barry H. Reeves, Union City, TN (US)

( * ) Notice: Subject to any disclaimer, the term of this patent is extended or adjusted under 35 U.S.C. 154(b) by 0 days.

(21) Appl. No.: 12/535,476

(22) Filed: Aug. 4, 2009

(65) Prior Publication Data

US 2010/0274439 A1    Oct. 28, 2010

Related U.S. Application Data

(63) Continuation of application No. 11/420,395, filed on May 25, 2006, now abandoned.

(51) Int. Cl.
*G06F 7/70* (2006.01)
*G06F 19/00* (2011.01)
*G06G 7/00* (2006.01)
*G06G 7/76* (2006.01)

(52) U.S. Cl. ............................................. 701/50; 52/53

(58) Field of Classification Search .................... 701/50, 701/52, 53; 278/37; 29/891; 706/904, 912; 340/684; 348/89; 198/312, 313, 317, 412, 198/413, 417, 502.1, 657, 674, 612, 613, 198/812, 813, 817
See application file for complete search history.

(56) References Cited

U.S. PATENT DOCUMENTS

| | | | | |
|---|---|---|---|---|
| 3,452,885 A * | 7/1969 | Love | ............................ | 414/345 |
| 3,583,405 A * | 6/1971 | Gerhardt et al. | .................. | 460/1 |
| 3,669,291 A * | 6/1972 | De Coene | ..................... | 414/502 |
| 4,286,530 A * | 9/1981 | Conley | .......................... | 111/200 |
| 4,893,241 A * | 1/1990 | Girodat et al. | .................. | 701/50 |
| 5,011,359 A * | 4/1991 | McDonald | ..................... | 414/289 |
| 5,046,362 A * | 9/1991 | Strubbe | ............................ | 73/579 |
| 5,051,874 A * | 9/1991 | Guss | ............................ | 362/89 |
| 5,156,570 A * | 10/1992 | Justice, III | ..................... | 460/118 |
| 5,518,453 A * | 5/1996 | Tribbett | ............................ | 460/1 |
| 5,586,033 A * | 12/1996 | Hall | ............................... | 701/50 |
| 5,904,365 A * | 5/1999 | Dillon | ........................... | 280/419 |
| 5,978,720 A * | 11/1999 | Hieronymus et al. | ........... | 701/29 |
| 5,986,559 A * | 11/1999 | Larson | ........................... | 340/672 |
| 6,097,425 A * | 8/2000 | Behnke et al. | ................... | 348/89 |
| 6,208,255 B1 * | 3/2001 | Conrad et al. | ................. | 340/606 |
| 6,282,476 B1 * | 8/2001 | Hieronymus et al. | ........... | 701/50 |
| 6,346,888 B1 * | 2/2002 | Conrad et al. | ................. | 340/606 |
| 6,553,300 B2 * | 4/2003 | Ma et al. | .......................... | 701/50 |
| 6,661,338 B2 * | 12/2003 | Holthaus | ................. | 340/309.16 |
| 6,690,285 B2 * | 2/2004 | Schafer et al. | ................. | 340/684 |
| 6,820,459 B2 * | 11/2004 | Beck et al. | ..................... | 73/1.16 |
| 6,943,824 B2 * | 9/2005 | Alexia et al. | .................... | 348/89 |
| 6,980,896 B2 * | 12/2005 | Stamerra | ......................... | 701/50 |
| 7,034,666 B2 * | 4/2006 | Knutson | ......................... | 340/431 |
| 2001/0040084 A1 * | 11/2001 | Tofin et al. | ..................... | 198/671 |
| 2003/0169176 A1 * | 9/2003 | Schafer et al. | ................ | 340/684 |
| 2003/0174207 A1 * | 9/2003 | Alexia et al. | .................... | 348/89 |
| 2004/0013506 A1 * | 1/2004 | Guhr et al. | ..................... | 414/526 |
| 2006/0045701 A1 * | 3/2006 | Dillon | ........................... | 414/526 |

* cited by examiner

*Primary Examiner* — Khoi Tran
*Assistant Examiner* — Jorge O Peche
(74) *Attorney, Agent, or Firm* — Moore & Van Allen; W. Kevin Ransom

(57) ABSTRACT

The systems and methods of the present invention employ either a sensor in communication with the auger or a sensor in the form of a switch operated by the user of the auger. When the sensor detects that the auger is operating or the switch is operated by the auger operator, an indication of auger operation is published to a remote location. The indication may be in the form of an aural or visual indication or in the form of a wireless transmission.

7 Claims, 6 Drawing Sheets

SYSTEM AND METHOD FOR INDICATING TO A REMOTE LOCATION OPERATION OF AN AUGER OR THE LIKE

CROSS-REFERENCE TO RELATED APPLICATIONS

The present application is a continuation of U.S. patent application Ser. No. 11/420,395, filed May 25, 2006 and entitled, SYSTEM AND METHOD FOR INDICATING TO A REMOTE LOCATION OPERATION OF AN AUGER OR THE LIKE, the contents of which application is incorporated herein by reference.

BACKGROUND OF THE INVENTION

1. Field of the Invention

The present invention relates to systems and methods for providing an indication to a remote location regarding operation of an auger, such as an auger used in a harvest combine or the like.

2. Description of the Related Art

A common method for moving grain, soil, liquids, etc. from one container to another is an auger. An auger comprises a helical shaft located in a tube or housing. As the shaft is rotated, material, such as grain, is transported by the shaft along the wall of the housing and distributed into a container at an opening in the housing of the auger.

In many instances, it is important to provide indications of auger operation to a remote user. For example, where an auger is used to redistribute material from one container to another, the auger should be monitored to ensure it does not overfill the receiving container. Further, in some instances, it is important to not completely empty the container from which material is being drawn. Where an auger is used to fill several smaller containers from a larger container, it is important to monitor when the auger is not in operation for switching out receiving containers so that material meted out by auger is not wasted.

FIG. 1 illustrates one example of the importance of providing a remote indication of auger operation. A harvest combine 10 is in operation separating grain from plants and depositing the grain in a container 12 associated with the combine 10. The combine 10 further includes an auger 14 for removing grain from the container 12 into a truck, buggy, boxcar, or other similar hauler. As illustrated, the combine is emptying the grain into a buggy 16 being pulled by a tractor 18. In the present example, a driver positions the buggy near the combine and grain is dispensed into the buggy as the combine and buggy are driven. In this manner, the combine can continue to harvest grain while also transferring grain to the buggy.

As is readily apparent, knowledge of when the auger is in operation is important for operation of the tractor and buggy. The operator should maintain the buggy under the outlet of the auger when the auger is dispensing grain, so that the grain does not fall to the ground. When the auger is not in operation, the operator can safely remove the buggy from under the auger to haul the grain away. FIG. 1 is just one example of the many instances where remote indication of auger operation is important.

In conventional systems, communications concerning auger operation have been rudimentary at best. In the example of FIG. 1, information concerning auger operation is typically in the form of visual or oral communication between the operator of the combine and the operator of the tractor. This is a highly disadvantageous form of communication, as it requires eye contact between the operators, which is difficult given that both the combine and tractor are typically moving and constantly altering course, dust and glare, and predawn and/or after dark operation of the vehicles. As such, systems and methods are needed to provide a more reliable indication of auger operation to a remote location.

BRIEF SUMMARY OF THE INVENTION

The present invention provides systems and methods that overcome the above, as well as other disadvantages noted with prior art auger systems. Specifically, systems and methods of the present invention provide an indication to a remote location of auger operation.

The systems and methods of the present invention employ either a sensor in communication with the auger or a sensor in the form of a switch operated by the user of the auger. When the sensor detects that the auger is operating or the switch is operated by the auger operator, an indication of auger operation is published to a remote location. The indication may be in the form of an aural or visual indication or in the form of a wireless transmission.

For example, in one embodiment, the systems and methods of the present invention employ a switch connected to the drive mechanism of the auger. The switch is transitioned between the "on" and "off" position by operation of the drive mechanism. When the drive mechanism is engaged to operate the auger, the switch is transitioned between states. In this embodiment, the switch controls operation of a light located in conspicuous location. By studying the light from a remote location, one can determine operation of the auger. Alternatively, the switch could be associated with a speaker, display, or a wireless communication system for indicating to a remote location operation of the auger.

In an alternative embodiment, the sensor of the present invention is associated with the controls of the auger. When the auger is controlled to operate, this is detected by the sensor, which in turn, provides an indication to a remote location. In still further embodiments, the sensor may be a switch that is operated by the auger operator. The sensor could be a flow meter located in the auger or a sensor for sensing rotation of the helical shaft of the auger, or any other type of system that detects operation of the auger.

The indicator for providing a remote indication of auger operation may also take many forms. In some embodiments, the indicator is a light, display, and/or speaker for providing either visual and/or aural indications. Alternatively, the indicator could be a wireless transmitter or transceiver for transmitting wireless communications, such as radio frequency RF or infrared IR. In the embodiments where a wireless transmitter or transceiver is employed at the auger, the remote location will include a receiver or transceiver for receiving the wireless communications and providing an indication to the remote operator.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
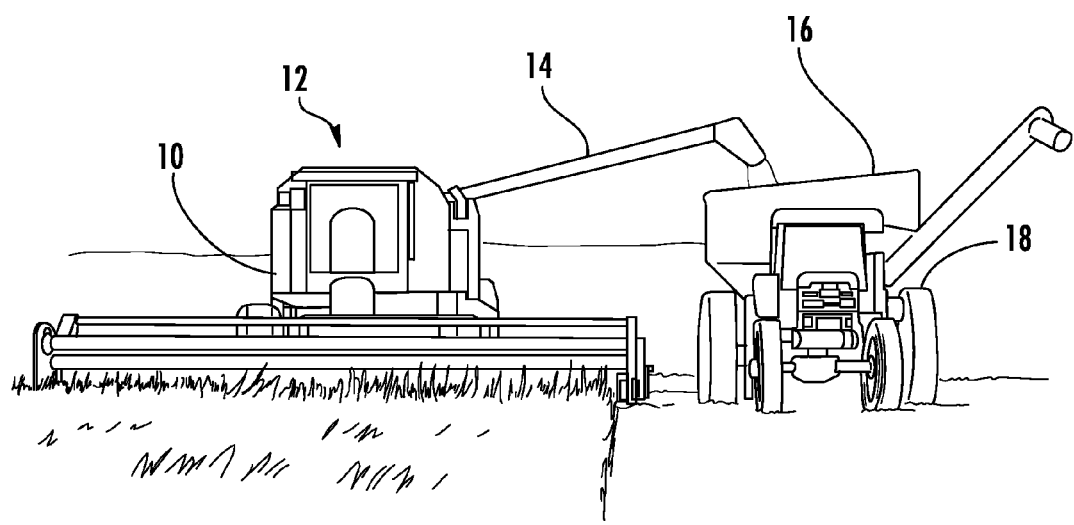
FIG. 1 is an illustration of an auger system in operation according to the prior art.
Figure 2A:
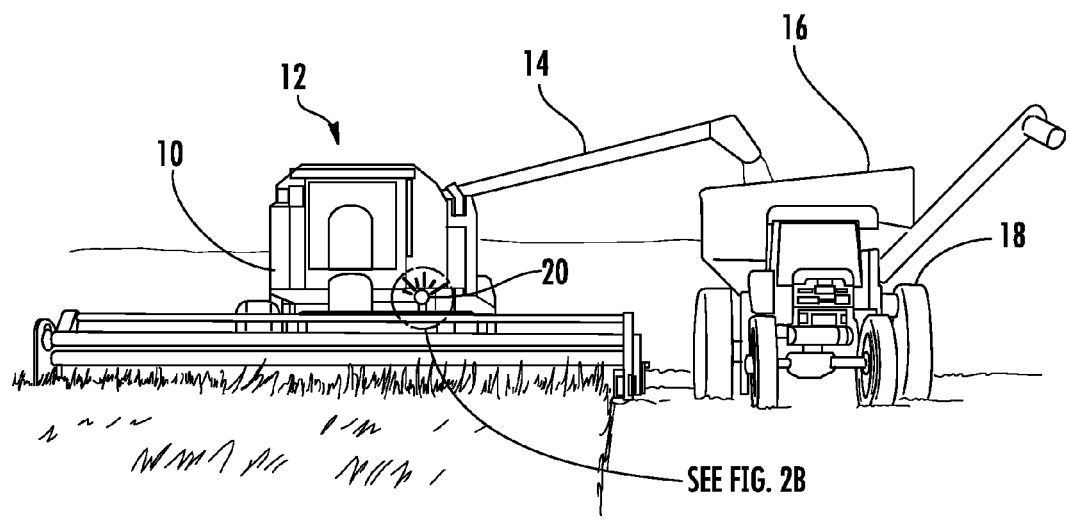
FIG. 2A is an illustration of a system according to one embodiment of the present invention implemented in the auger system of FIG. 1.
Figure 2B:
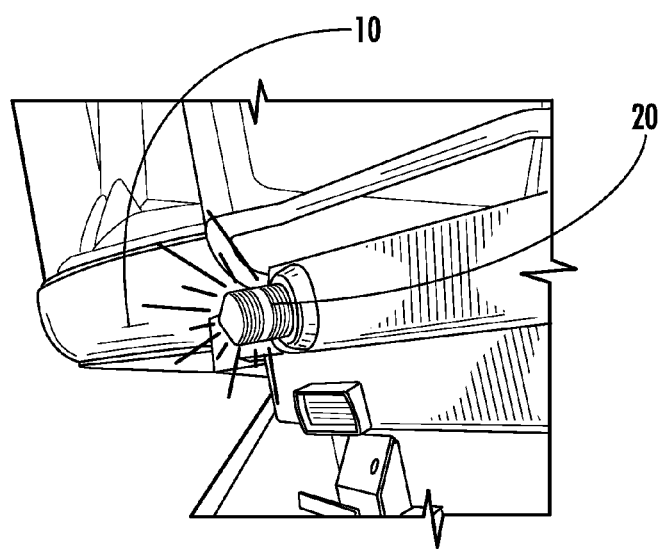
FIG. 2B is an exploded view of a portion of the indicator of the system of FIG. 2A according to one embodiment of the present invention.

FIGS. 2A and 2B are illustrations of the systems and methods of the present invention employed in the auger system depicted in FIG. 1. Similar to FIG. 1, FIG. 2A illustrates the harvest combine 10 dispensing grain into the buggy 16. However, FIG. 2 further illustrates an indicator 20 according to one embodiment of the present invention providing an indication to a remote location that the auger is in operation. As can be appreciated, using the systems and methods of the present invention a remote operator can more easily determine the operation of the auger and ensure that the buggy, grain truck, box car, or other type of receiving container is positioned under the auger during its operation.

Figure 3A:
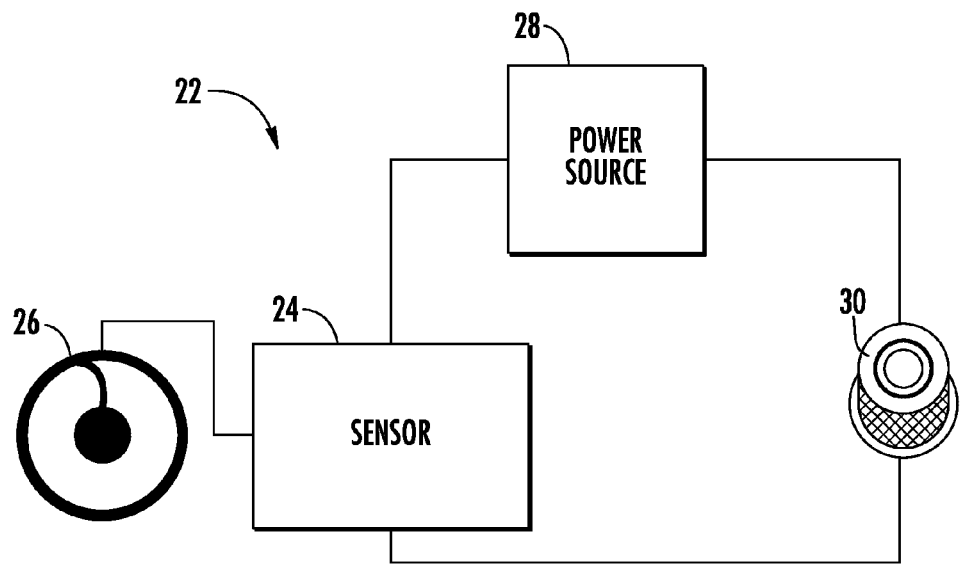
FIG. 3A is a simplified block diagram of a system according to one embodiment of the present invention that uses a visual indicator to remotely indicate auger operation.

FIG. 3A is a simplified block diagram illustrating the various components of a system 22 according one embodiment of the present invention. In this embodiment, the system includes a sensor 24 in communication with an auger 26. The sensor is connected in series with a power source 28 and a light 30. The sensor 24 is either a switch or associated with a switch for controlling flow of current from the power source to the light. The light is mounted in a conspicuous location to provide a remote indication of the auger operation. When the sensor senses that the auger is in operation, it closes the switch allowing current flow to the light, which is then illuminated. When the sensor senses that the auger is not in operation, it opens the switch cutting off current flow to the light so that the light is not illuminated.

Figure 3B:
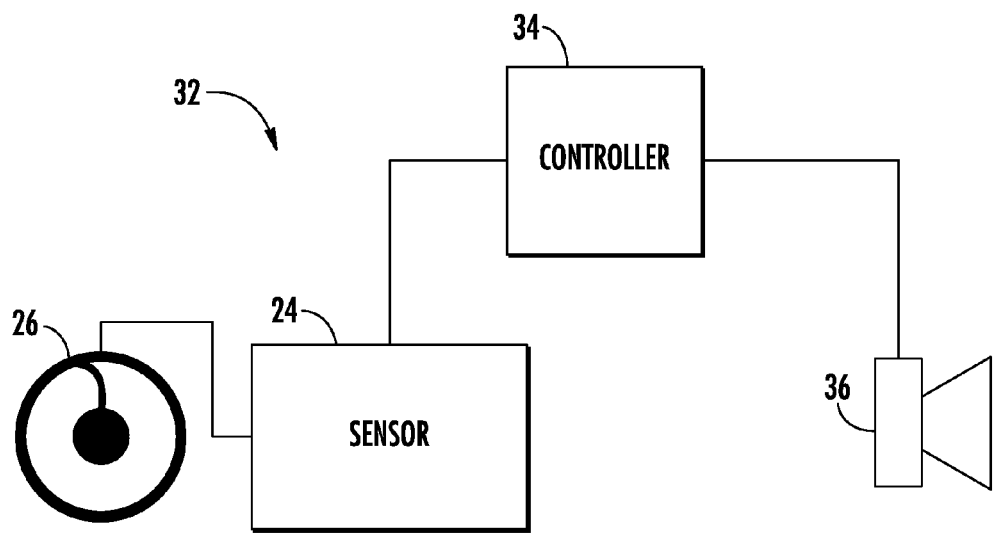
FIG. 3B is a simplified block diagram of a system according to one embodiment of the present invention that uses an aural indicator to remotely indicate auger operation.

FIG. 3B is a simplified block diagram illustrating the various components of a system 32 according another embodiment of the present invention. In this embodiment, the system includes a sensor 24 in communication with an auger 26. Connected to the sensor is a controller 34, which is, in turn, connected to a speaker 36. When the sensor senses that the auger is in operation, a signal is sent to the controller. The controller then operates the speaker to provide either a constant or periodic audible sound. When the sensor senses that the auger is not in operation, the controller does not sound the speaker. Alternatively, the controller could be connected to a display for providing visual indication of auger operations to a user.

Figure 3C:
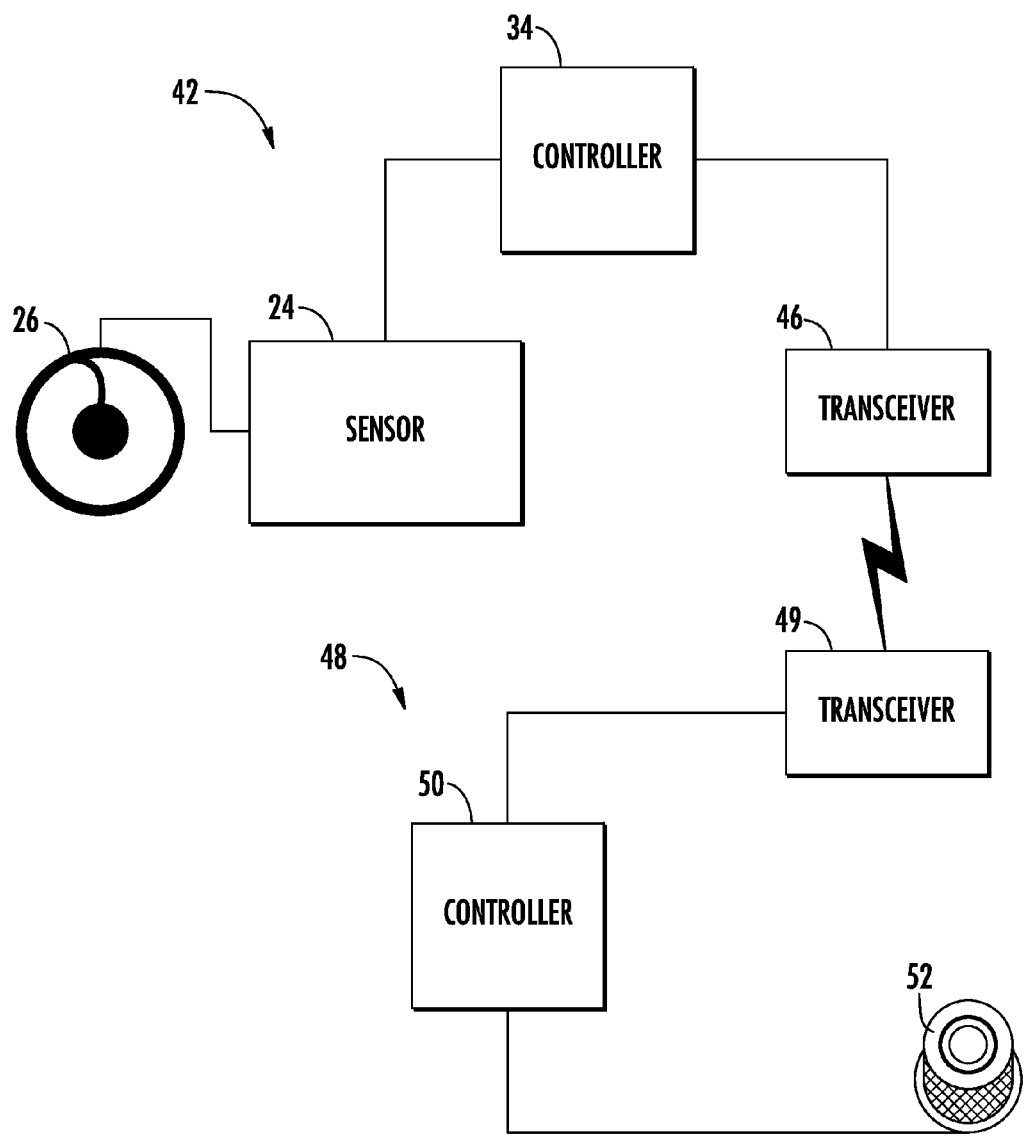
FIG. 3C is a simplified block diagram of a system according to one embodiment of the present invention that uses wireless communications to remotely indicate auger operation.

FIG. 3C is a simplified block diagram illustrating the various components of a system 42 according another embodiment of the present invention. In this embodiment, the system includes a sensor 24 in communication with an auger 26. Connected to the sensor is a controller 34, which is, in turn, connected to a transmitter or transceiver 46, such as an RF or infrared transceiver. When the sensor senses that the auger is in operation, a signal is sent to the controller. The controller then operates the transceiver to transmit a wireless signal.

In this embodiment, the remote location 48 comprises a receiver or transceiver 49 connected to a controller 50, which, in turn, is connected to an indicator 52. The indicator 52 can be a light, speaker, display, etc. When the signal transmitted by the system 42 is received at the remote location, the controller 50 operates the indicator 52 to provide an indication to a remote user that the auger is in operation. While not shown, in embodiments where the indicator is a light, the system of the present invention may include a blinker device for intermittently providing a signal to the indicator to thereby cause the indicator to blink. Use of a blinking indicator may be advantageous to draw the user's attention, especially where various other lights may be operating on the auger or combine.

Figure 4:
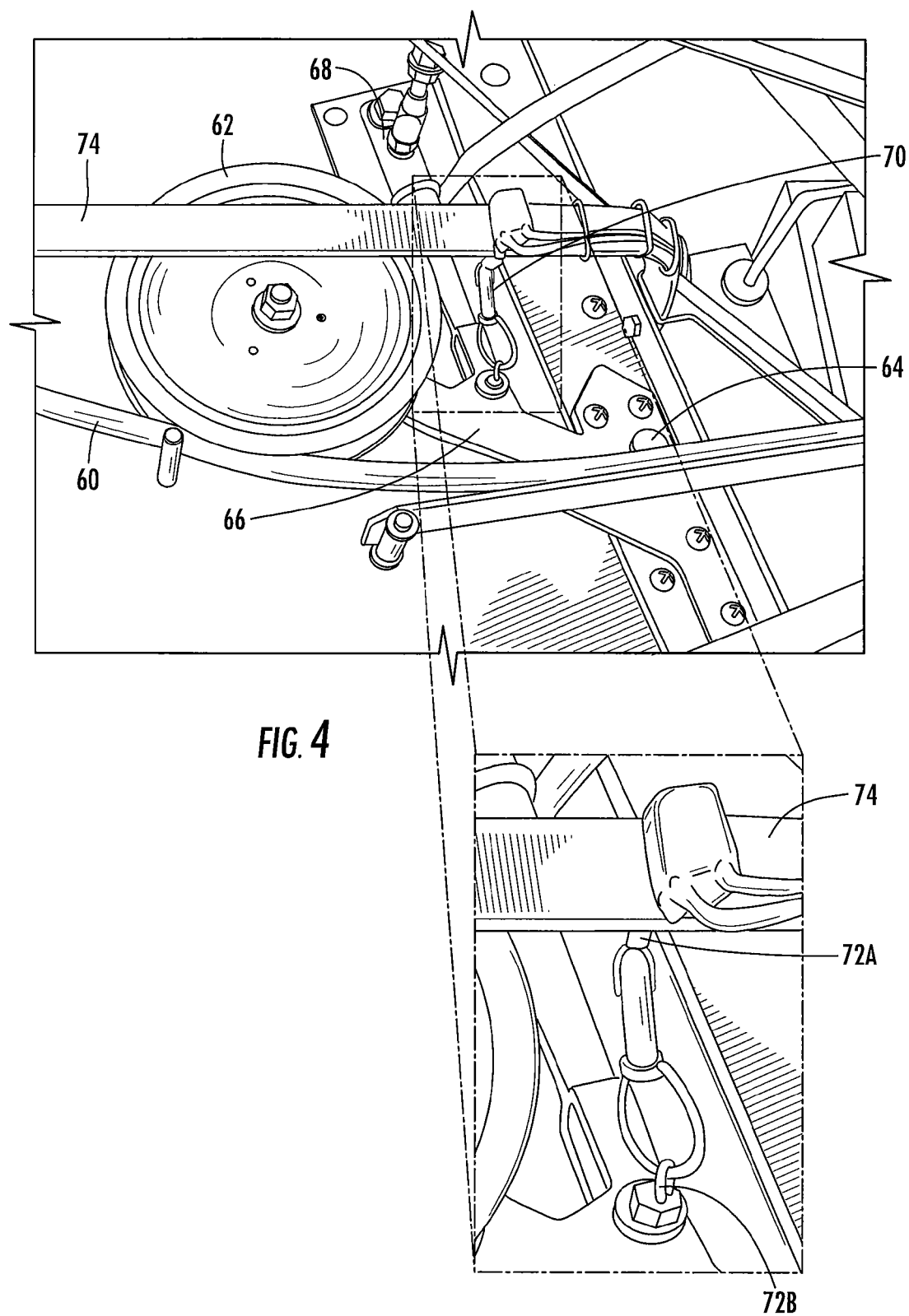
FIG. 4 illustrates location of a sensor of the system on the auger drive mechanism according to one embodiment of the present invention.

FIG. 4 discloses a unique location for a sensor for sensing auger operation according to one embodiment of the present invention. FIG. 4 illustrates an auger drive mechanism in the form of a belt 60 and pulley 62 used to rotate the shaft of the auger, not shown. The pulley is connected to a stationary pivot point 64 via a pivot arm 66. Connected to the pivot arm is a hydraulic piston 68. The hydraulic arm is operated to selectively engage and disengage the auger. In an extended position, the hydraulic piston 68 rotates the pulley 62 into contact with the belt 60. In this position, the belt drives the shaft of the auger. In a retracted position, the hydraulic piston 68 rotates the pulley 62 away from contact with the belt 60. In this position, the auger is not in operation.

As illustrated, in this embodiment of the invention, a sensor in the form of a contact switch 70 is located relative to the pivot arm 66. A first portion 72a of the switch is connected to a stationary arm 74, while a second portion 72b of the switch is connected to the pivot arm 66. The switch is configured such that the contacts are separated from each other when the switch is in a non-extended state, but are brought into contact with each other when the first and second portions of the switch are extended relative to each other. An example would be a toggle switch which is spring loaded to the off position. When the pivot arm is extended, the switch contacts are closed. When the pivot arm is retracted, the spring loaded switch return to the off position. With reference to FIGS. 3A-3C, the switch 70 of this embodiment may be connected in any of the configurations disclosed in these figures for providing a remote indication of auger operation.

Returning to FIG. 4, location of the switch 70 relative to the auger drive mechanism provides an accurate method of detecting auger operation. When ever the auger is engaged, the switch is activated. Thus, automatic detection of auger operation is achieved without requiring input from the auger operator.

Figure 5:
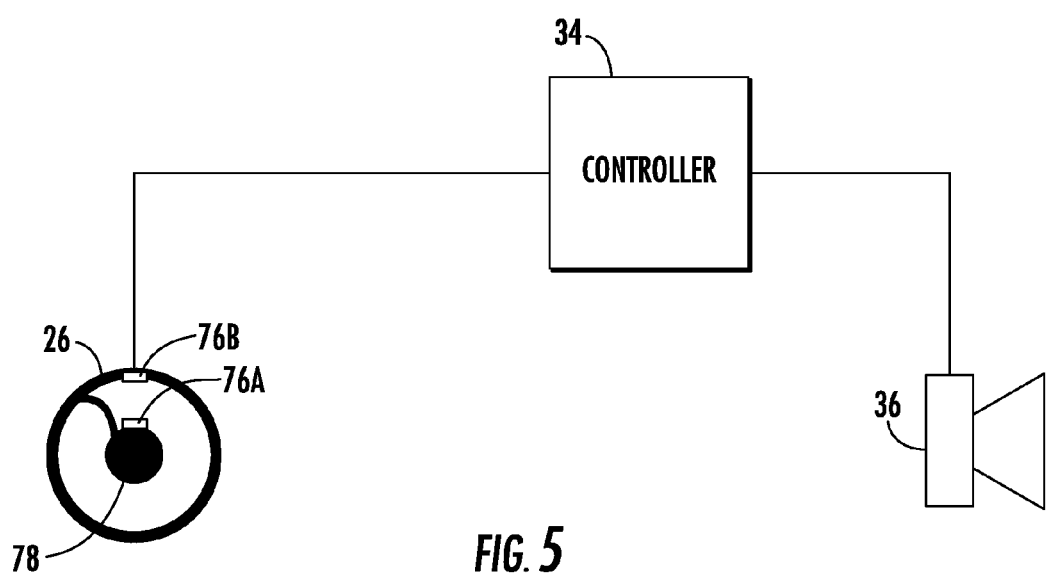
FIG. 5 illustrates a sensor for sensing rotation of the shaft of the auger according to one embodiment of the present invention.

FIG. 5 illustrates another sensor that may be used in the various embodiments illustrated in FIGS. 3A-3C. In this embodiment, the sensor comprises a reflector 76a coupled to the shaft 78 of the auger 26. Spaced away from the reflector is an optical transceiver 76b. The optical transceiver emits an optical beam directed at the shaft. When the shaft is rotating, the reflector 76a will periodically come in to contact and reflect the optical beam back to the transceiver, thereby indicating that the shaft is rotating. This embodiment of the sensor may be further used to indicate the rotational speed of the shaft. As the shaft rotates faster, the transceiver will receive more frequent instances of the reflected optical beam. If the sensor is connected to a light (such as in FIG. 3A) or a speaker (such as in FIG. 3B), the higher frequency of the "on" and "off" times of the visual or audible signal will indicate to a remote user the rotation speed of the shaft. In the instance that such a sensor is used in conjunction with the system of FIG. 3C, the speed of the shaft could be displayed to the user using known speed conversion techniques.

It is to be understood that the above disclosed embodiments of the sensor and the systems used for providing indications of auger operation described above should not be seen as limiting the scope of the invention. Any form of sensor or switch capable of being configured to sense auger operation is considered part of the invention. The sensor could be a manual switch operated by the auger operator, associated with switches used to operate the auger, associated with the drive system to determine when the shaft is in operation, rotational sensors, flow meters, voltage or currents sensors, etc. Systems for notifying a remote user of auger operation are also not limited to those described above. The indicator may take any form, including but not limited to, visual, aural, wireless transmissions. In the case of wireless transmissions, the system may use infrared, RF, BlueTooth, WI-FI, satellite, or other forms of wireless communication.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for providing an indication to a remote location relating to operation of auger associated with a harvesting combine, said system comprising:
   a harvesting combine for harvesting grain from a field and an auger for off loading the grain from said harvesting combine, said harvesting combine comprising:
   an auger drive mechanism comprising a belt and a pulley used to rotate the shaft of the auger, wherein the pulley is connected to a stationary pivot point via a pivot arm, wherein the pivot arm is operated to selectively engage and disengage the auger, such that in an extended position, the pivot arm rotates the pulley into contact with the belt to drive the shaft of the auger and in a retracted position, the pivot arm rotates the pulley away from contact with the belt;
   a first device associate with the auger of the harvesting combine comprising:
   a sensor for detecting when the auger is in operation, wherein said sensor is located relative to the pivot arm such that a first portion of the sensor is connected to a stationary arm and the second portion of the sensor is connected to the pivot arm, such that the sensor senses the position of the pivot arm to determine whether the auger is operating; and
   a transmitter in communication with said sensor, for transmitting a signal remotely when the sensor indicates that the auger is in operation; and
   a hauler located remotely from the harvesting combine and positioned relative to the auger to off load grain from the harvesting combine, said hauler comprising:
   a second device positioned at a location that is remote from the harvesting combine comprising:
   a receiver in communication with said transmitter of said first device for receiving the signal transmitted by said transmitter; and
   an indicator in communication with said receiver, said indicator positioned for providing a visible and/or audible indication when the auger is in operation.

2. A harvesting combine comprising:
   an auger for dispensing grain from a container associated with the combine;
   a sensor for detecting when the auger is in operation; and
   an indicator in communication with said sensor, for providing an indication when the auger is in operation,
   wherein said indicator transmits the indication to an operator of a hauler, where the hauler is located remotely from the harvesting combine and is positioned relative to the auger to off load grain from the harvesting combine,
   wherein said auger comprises an auger drive mechanism comprising a belt and a pulley used to rotate the shaft of the auger, wherein the pulley is connected to a stationary pivot point via a pivot arm, wherein the pivot arm is operated to selectively engage and disengage the auger, such that in an extended position, the pivot arm rotates the pulley into contact with the belt to drive the shaft of the auger and in a retracted position, the pivot arm rotates the pulley away from contact with the belt, and
   wherein said sensor is located relative to the pivot arm such that a first portion of the sensor is connected to a stationary arm and the second portion of the sensor is connected to the pivot arm, such that the sensor senses the position of the pivot arm to determine whether the auger is operating.

3. A harvesting combine according to claim 2, wherein said indicator is a light.

4. A harvesting combine according to claim 2, wherein said indicator is a speaker.

5. A harvesting combine according to claim 2 further comprising a controller connected between said sensor and said indicator for controlling said indicator based on output from said sensor.

6. A harvesting combine according to claim 2, wherein said indicator is positioned on an exterior surface of the body of the harvesting combine.

7. A harvesting combine according to claim 2, wherein said indicator comprises:
   a first device comprising a transmitter in communication with said sensor, for transmitting a signal remotely when the sensor indicates that the auger is in operation;
   a second device positioned at a location that is remote from the harvesting combine comprising:
   a receiver in communication with said transmitter of said first device for receiving the signal transmitted by said transmitter; and
   an indicator in communication with said receiver, wherein said indicator is positioned for providing a visible and/or audible indication when the auger is in operation.

* * * * *